United States Patent
Kitada (10) Patent No.: US 8,964,148 B2
(45) Date of Patent: Feb. 24, 2015

(54) BACKLIGHT UNIT AND LIQUID CRYSTAL DISPLAY DEVICE

(75) Inventor: Takaaki Kitada, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 923 days.

(21) Appl. No.: 13/162,284

(22) Filed: Jun. 16, 2011

(65) Prior Publication Data

US 2011/0310326 A1    Dec. 22, 2011

(30) Foreign Application Priority Data

Jun. 18, 2010  (JP) .................................. 2010-139839

(51) Int. Cl.
G02F 1/1335    (2006.01)

(52) U.S. Cl.
CPC .............................. *G02F 1/133608* (2013.01)
USPC ............................................. 349/69; 349/62

(58) Field of Classification Search
USPC ...................................................... 349/62, 69
See application file for complete search history.

(56) References Cited

U.S. PATENT DOCUMENTS

| 2009/0109374 A1* | 4/2009 | Tsubokura et al. ............. 349/70 |
| 2009/0140656 A1* | 6/2009 | Kohashikawa et al. ....... 315/151 |

FOREIGN PATENT DOCUMENTS

| JP | 2007-148177 | 6/2007 |
| JP | 2007-322697 | 12/2007 |
| JP | 2008-152101 | 7/2008 |
| JP | 2009-104978 | 5/2009 |
| JP | 2010-015853 | 1/2010 |
| WO | 2007/063846 | 6/2007 |

* cited by examiner

*Primary Examiner* — Phu Vu
(74) *Attorney, Agent, or Firm* — Hamre, Schumann, Mueller & Larson, P.C.

(57) ABSTRACT

A backlight unit comprises a circuit board (20) having, a plurality of LED's (22) arranged in a matrix, a diffuser panel (62), and a support pin (50) positioned between the circuit board (20) and the diffuser panel (62) for supporting the diffuser panel (62). The support pin (50) includes a first fixation portion (51) inserted in a hole (21) formed on the circuit board (20), a second fixation portion (52) positioned apart from the first fixation portion (51), and a pillar (53) having a tip end supporting the diffuser panel (62). The pillar (53) and the first fixation portion (51) are aligned in a direction perpendicular to the circuit board (20). According to this backlight unit, it is possible to ensure freedom in wiring around the LED's (22) and to prevent the pillar (53) of the support pin (50) from hindering the light.

5 Claims, 7 Drawing Sheets

BACKLIGHT UNIT AND LIQUID CRYSTAL DISPLAY DEVICE

CROSS-REFERENCE TO RELATED APPLICATION

The present application claims priority from Japanese application JP2010-139839 filed on Jun. 18, 2010, the content of which is hereby incorporated by reference into this application.

BACKGROUND OF THE INVENTION

1. Field of the Invention

The present invention relates to a backlight unit for a liquid crystal display device, having a plurality of light sources arranged thereon in a matrix and a liquid crystal display device.

2. Description of the Related Art

Liquid crystal display devices having direct type backlight units have been available. Conventionally, a plurality of fluorescent lamps or light emitting diodes (hereinafter referred to as an LED) arranged in a matrix have been used as a light source for such a type of backlight units.

Japan Patent Publication No. 2009-104978 discloses a backlight unit that utilizes a fluorescent lamp. The backlight unit has a panel-like chassis, a diffuser panel, and a fluorescent lamp placed between the former two. The backlight unit further has a support pin (referred as an optical sheet support pillar in the above Patent Document) placed between the diffuser panel and the chassis for supporting the diffuser panel. The support pin has two fixation portions provided on a lower part thereof, and the respective fixation portions are inserted into respective holes formed on the chassis to be thereby fixed to the chassis. The support pin has an upright pillar formed a middle position between the two fixation portions. The pillar supports, on the tip end thereof, the diffuser panel.

SUMMARY OF THE INVENTION

A support pin, such as is disclosed in Japan Patent Publication No. 2009-104978, has been studied to be used in a backlight unit utilizing a plurality of LED's arranged in a matrix as a light source. However, the support pin disclosed in Japan Patent Publication No. 2009-104978 may cause a problem such as is described below when used in the above mentioned direct type backlight unit.

Specifically, in order to use a support pin in a backlight unit utilizing a plurality of LED's as a light source, a circuit board having LED's mounted thereon needs a hole formed thereon for accepting a fixation portion of a support pin. Moreover, a wiring pattern connected to the LED's is needed around the LED's on the circuit board. Therefore, in order to ensure freedom for the wiring around the LED's, the respective fixation portions and the respective holes for accepting the fixation portions are desirably positioned apart from the LED's. In addition, if the pillar supporting the diffusing panel is positioned close to the LED's, the pillar may hinder the proceeding of the light from the LED's. In this view, the pillar as well is desired to be positioned apart from the LED's. However, according to Japan Patent Publication No. 2009-104978, since the pillar is formed at the middle position between the two fixation portions, the arrangement in which each fixation portion is positioned far apart from the LED's likely cause a problem that the pillar positioned near the LED's. In other words, it cannot be readily achieved that both of the fixation portions and the pillar are positioned far apart from the LED's.

The present invention has been conceived in view of the above, and aims to provide a backlight unit and a liquid crystal display device capable of ensuring freedom in wiring around the light source, and preventing the pillar from hindering the proceeding of the light.

A backlight unit according to the present invention comprises a substrate having, on a front side thereof, a plurality of light sources arranged in a matrix; an optical member arranged to face the front side of the substrate, light from the plurality of light sources being transmitted through the optical member; and a support pin positioned between the substrate and the optical member, for supporting the optical member. The support pin includes a first fixation portion inserted in a hole formed on the substrate; a second fixation portion inserted in a hole formed on the substrate and positioned apart from the first fixation portion and; and a pillar aligned to the first fixation portion in a direction perpendicular to the substrate and having a tip end supporting the optical member.

In order to solve the above described problem, a liquid crystal display device according to the present invention comprises the above described backlight unit.

According to the present invention, the pillar is formed being aligned to the first fixation portion in a direction perpendicular to the substrate. Therefore, when a hole for accepting the first fixation portion is formed at a position apart from the respective light sources so that the first fixation portion is positioned apart from the respective light sources, the pillar as well is positioned apart from the respective light sources. This makes it possible to increase freedom in wiring around the light source and to prevent the pillar from hindering the proceeding of the light from the light source.

In one embodiment of the present invention, the first fixation portion may be surrounded by a plurality of light sources forming one unit of the matrix. In this embodiment, sufficient distance can be ensured between the first fixation portion and the light sources around the first fixation portion, which can increase freedom in wiring around the light source.

In this embodiment, the plurality of light sources surrounding the first fixation portion may be positioned at respective four corners of a quadrangle, and the first fixation portion may be positioned at a cross point of diagonals of the quadrangle. With the above, a more sufficient distance can be ensured between the first fixation portion and the light sources around the first fixation portion.

In this embodiment, the second fixation portion may be positioned outside the plurality of light sources surrounding the first fixation portion. With the above, a sufficient distance can be ensured also between the second fixation portion and the light sources. Further, in this embodiment, the second fixation portion may be positioned opposite the first fixation portion across a straight line, the straight line passing through two of the plurality of light sources surrounding the first fixation portion. With the above, a more sufficient distance can be ensured between the second fixation portion and the light source around the second fixation portion. Further, in this embodiment, the support pin may include a coupling portion positioned on the front side of the substrate, for coupling the first fixation portion and the second fixation portion. Further, the coupling portion may include a first connected portion to which the first fixation portion is connected; a second connected portion to which the second fixation portion is connected; and an extending portion extending between the first connected portion and the second connected portion. Further, the width of the extending portion is smaller than the width of the first connected portion and the width of the second connected portion. With the above, it is possible to prevent the coupling portion from hindering the light from the proceeding of the light source.

DETAILED DESCRIPTION OF THE INVENTION

Figure 1:
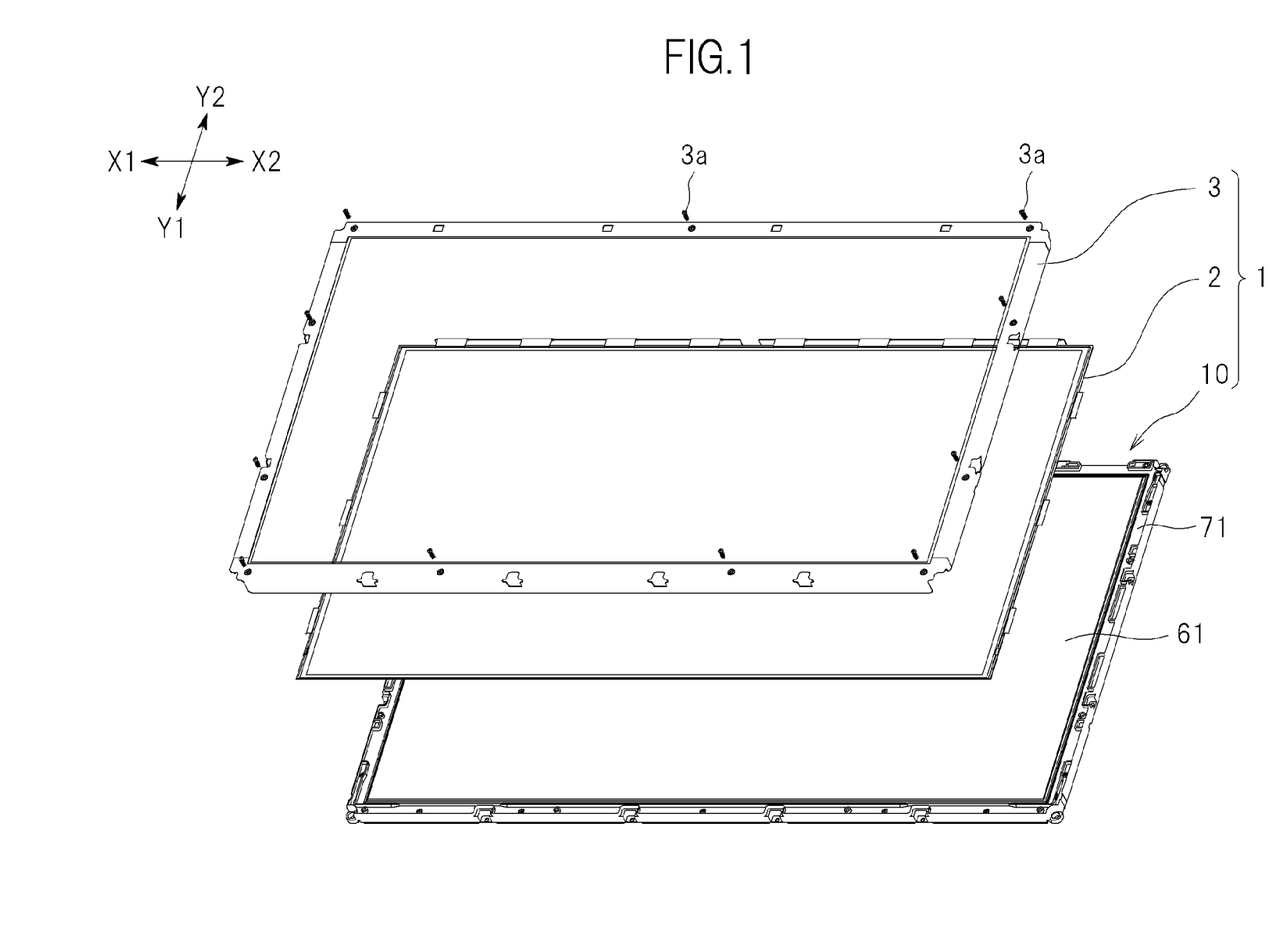
FIG. 1 is an exploded perspective view of a liquid crystal display device having a backlight unit according to an embodiment of the present invention.
Figure 2:
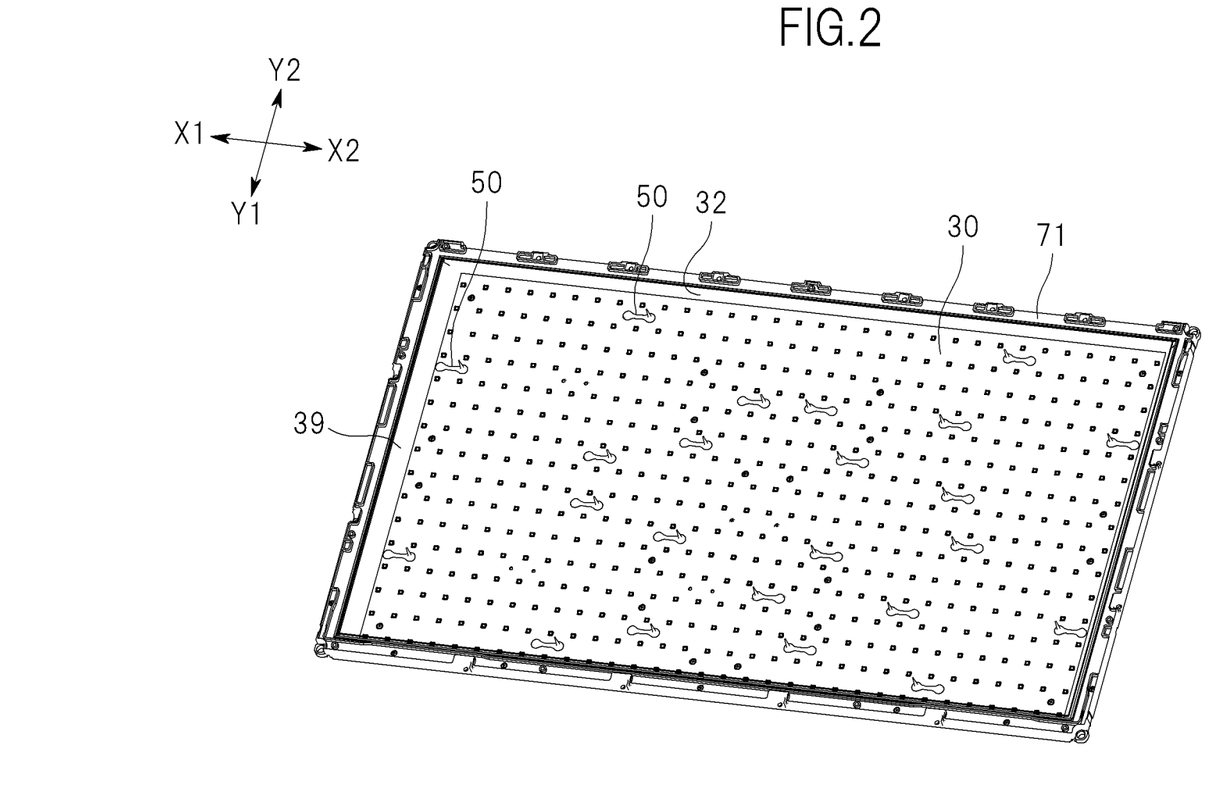
FIG. 2 is a perspective view of the above mentioned backlight unit with a diffuser panel and an optical sheet of the backlight unit removed.
Figure 3:
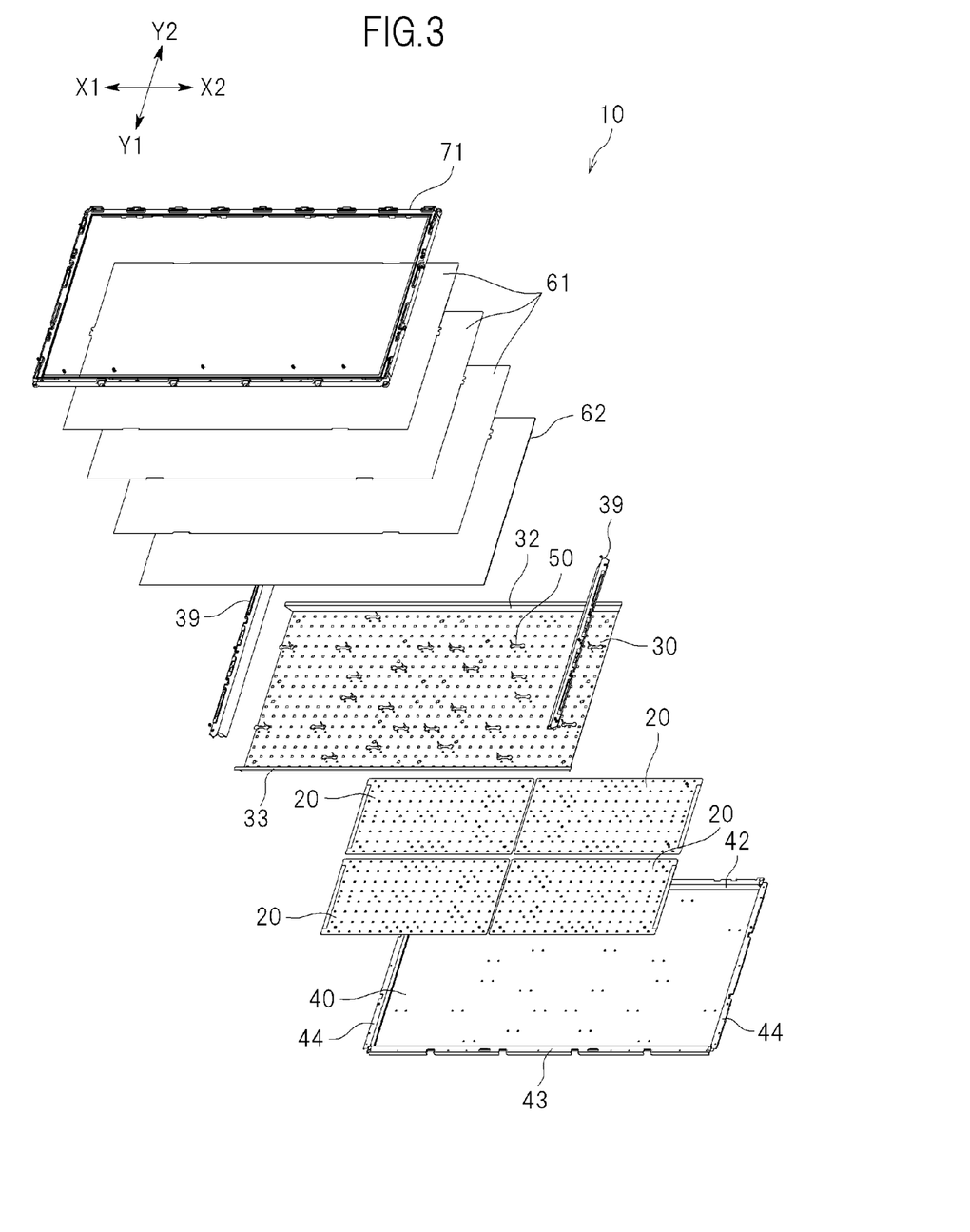
FIG. 3 is an exploded perspective view of the above mentioned backlight unit.
Figure 4:
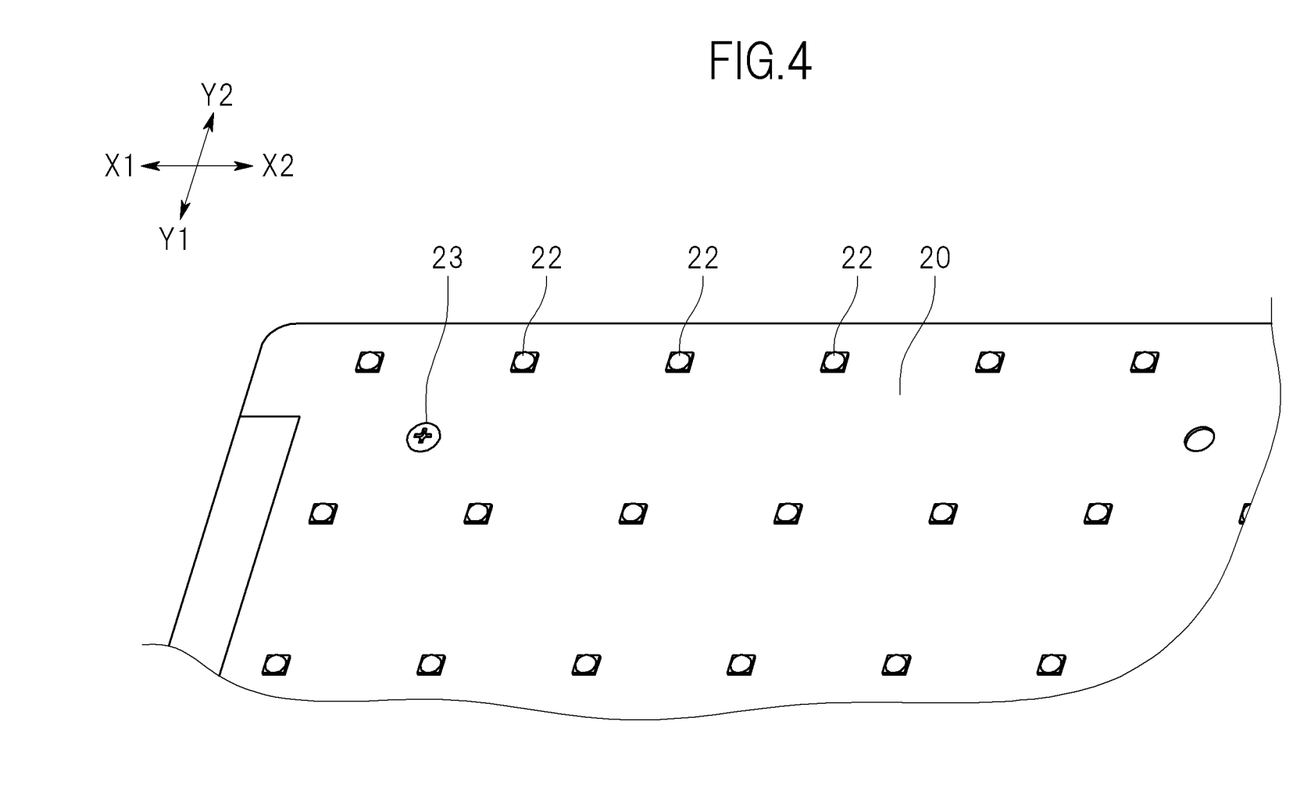
FIG. 4 is an enlarged perspective view of a circuit board of the above mentioned backlight unit.
Figure 5:
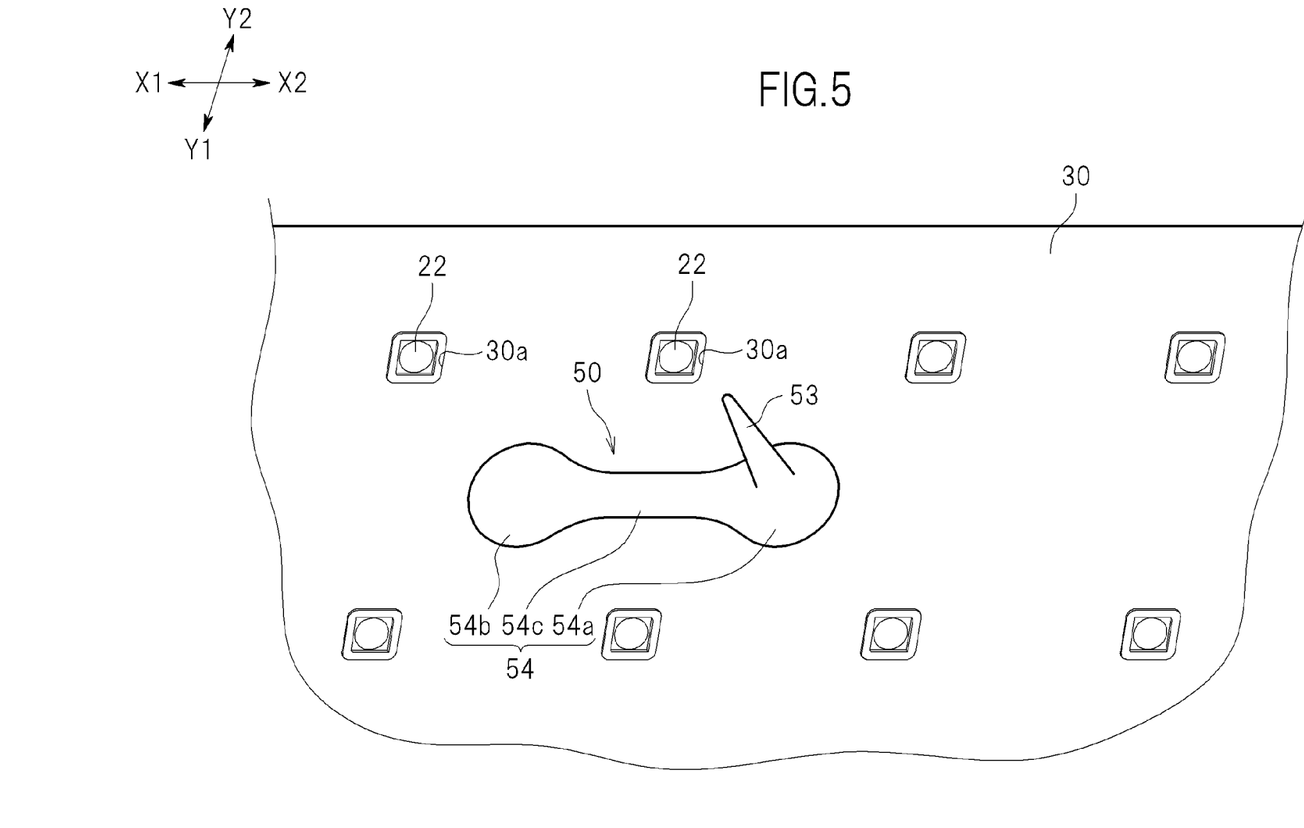
FIG. 5 is a perspective view of a support pin mounted on the circuit board.
Figure 6:
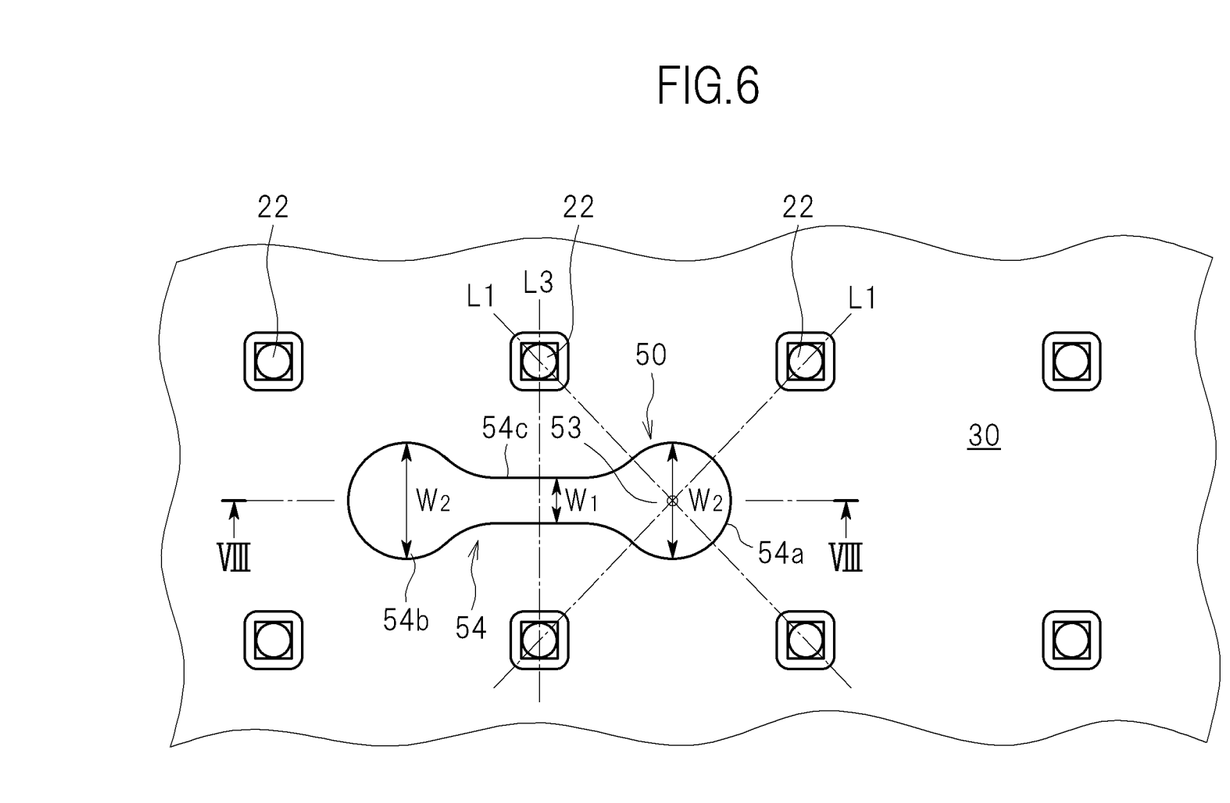
FIG. 6 is a plan view showing a positional relationship between the above mentioned support pin and the LED's mounted on the circuit board.
Figure 7:
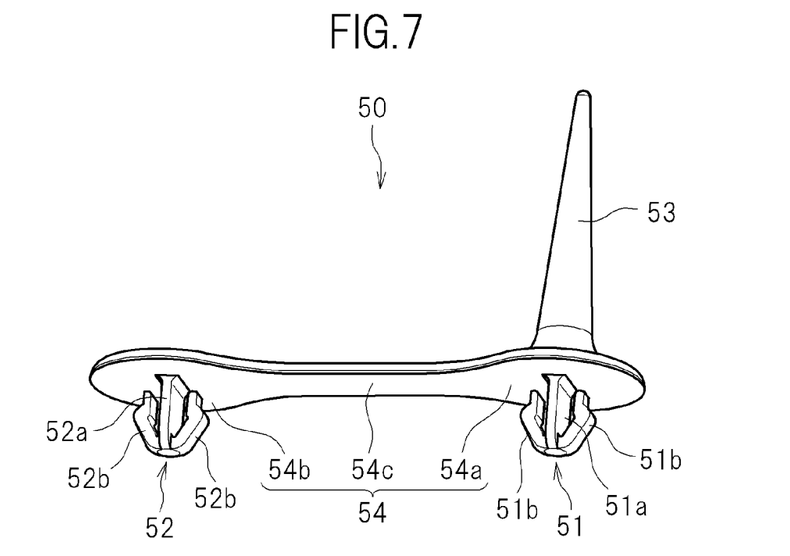
FIG. 7 is a perspective view of the above mentioned support pin.
Figure 8:
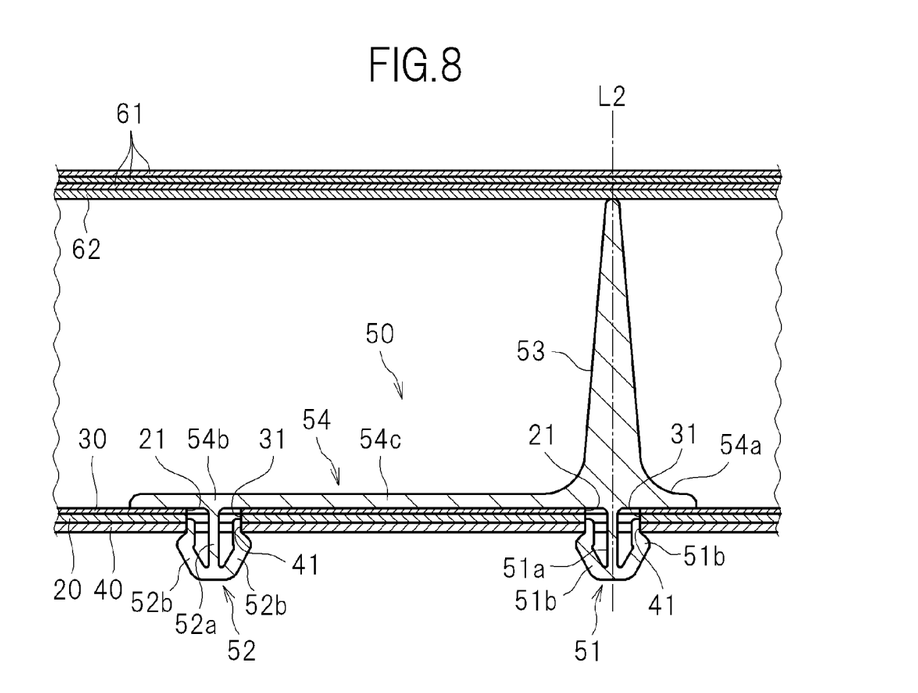
FIG. 8 is a cross sectional view along the line VIII-VIII shown in FIG. 6.

In the following, one embodiment of the present invention will be described with reference to the accompanying drawings. FIG. 1 is an exploded perspective view of a liquid crystal display device 1 having a backlight unit 10 that is an example of an embodiment of the present invention. FIG. 2 is a perspective view of the backlight unit 10 in which a diffuser panel 62 and an optical sheet 61 of the backlight unit 10 are removed. FIG. 3 is an exploded perspective view of the backlight unit 10. FIG. 4 is an enlarged perspective view of a circuit board 20 of the backlight unit 10. FIG. 5 is a perspective view of a support pin 50 mounted on the circuit board 20. FIG. 6 is a plan view showing a positional relationship between the support pin 50 and the LED's 22 mounted on the circuit board 20. FIG. 7 is a perspective view of the support pin 50 shown in FIG. 7. FIG. 8 is a cross sectional view along the line VIII-VIII shown in FIG. 6.

As shown in FIG. 1 or 3, the liquid crystal display device 1 comprises a liquid crystal display panel 2 and a backlight unit 10 provided on the back side of the liquid crystal display panel 2 and facing the liquid crystal panel 2. The backlight unit 10 when being used irradiates the back side of the liquid crystal display panel 2. The liquid crystal display panel 2 has two light transmitting glass substrates facing each other and liquid crystal injected between the two glass substrates and sealed. Transmission of the light from the backlight unit 10 is controlled by the liquid crystal. In this regards, the liquid crystal display device 1 is used as, e.g., a display device of a television set.

The liquid crystal display device 1 has a quadrilateral front frame 3 that encompasses the outer edge of the liquid crystal display panel 2. Further, the backlight 10 has a quadrilateral back frame 71 that encompasses a diffuser panel 62 or the like to be described later (see FIGS. 2 and 3). The outer edge of the liquid crystal display panel 2 is placed on the back frame 71. The front frame 3 is attached to the back frame 71 using a fastener, such as a screw 3a or the like, with the outer edge of the liquid crystal display panel 2 being sandwiched between itself and the back frame 71.

As shown in FIG. 3, the backlight unit 10 has a rectangular circuit board 20. In this example, the backlight unit 10 has a plurality of (four in this example) circuit boards 20 arranged in the horizontal direction (the X1-X2 direction in FIG. 3) and the vertical direction (the Y1-Y2 direction in FIG. 3) so that the plurality of circuit boards 20 as a whole constitute a substrate having a size in accordance with the liquid crystal display panel 2.

The backlight unit 10 is a so-called direct type backlight unit, and as shown in FIG. 4, a plurality of LED's (light emitting diode) 22 are provided as light sources on the front side (an upper side) of the circuit board 20. The LED's 22 in this example are mounted on the front surface of the circuit board 20. The plurality of LED's 22 are arranged in a matrix and align in two directions orthogonal to each other. In this example, the plurality of LED's 22 aligns in the vertical and horizontal directions with a regular interval such that four LED's 22 constitute one unit (single pattern) in the matrix. That is, each unit is quadrilateral (square in this example) with LED's 22 placed at the respective four corners thereof.

On the circuit board 20, a plurality of wiring patterns are formed and connected to the respective LED's 22. Specifically, in this example, a wiring pattern is formed on the back surface (the lower surface) of the circuit board 20, extending from, e.g., the respective LED 22 in the horizontal and vertical directions to be connected to a driving circuit through a connecter or the like mounted on an edge of the circuit board 20. The respective LED 22 is supplied with electrical drive power from the drive circuit through the wiring pattern. For example, the plurality of LED's 22 is controlled separately. Alternatively, the circuit board 20 may be divided into a plurality of areas so that the plurality of LED's 22 may be controlled for every area.

The backlight unit 10 has a flat optical member arranged on the front side of the circuit board 20, the light from the LED's 22 passing through the optical member. The flat optical member is positioned apart from and facing the circuit board 20. In this example, as shown in FIG. 3 or 8, the backlight unit 10 has, as the optical member, a plurality of optical sheets (e.g., a diffuser sheet, a prism sheet, and so forth) 61 and a diffuser panel 62 that is thicker than the optical sheet 61. The plurality of optical members are arranged as layers and in parallel to the circuit board 20. Specifically, the diffuser panel 62 is arranged as the lowest layer with the plurality of optical sheets 61 being placed on the diffuser panel 62.

Further, the backlight unit 10 has a reflection sheet 30 placed on the front surface of the circuit board 20. As shown in FIG. 5, the reflection sheet 30 has a plurality of quadrilateral holes 30a formed thereon, each of which passes through the reflection sheet 30. The position of each hole 30a corresponds to each LED 22 so that the LED 22 stays in the hole 30a to be exposed toward the diffuser panel 62 (i.e., upward). The reflection sheet 30 reflects the light from the LED's 22 toward the diffuser panel 62 and the optical sheet 61. The light from the LED's 22 then passes through the diffuser panel 62 and the optical sheet 61 to irradiate the back side of the liquid crystal display panel 2.

Further, the backlight unit 10 has a panel-like metal chassis 40 provided on the back side (the lower side) of the circuit board 20, as shown in FIG. 3 or 8. The chassis 40 is formed having a rectangular shape having a size in accordance with the liquid crystal display panel 2. The circuit boards 20 arranged in the horizontal and vertical directions are placed on the chassis 40. The respective circuit boards 20 are fixedly mounted on the chassis 40, using a plurality of screws 23 (see FIG. 4). In this regards, any other device may be fixed to the chassis 40. For example, for a liquid crystal display device 1 used for a television set, a receiver device and other circuit board may be fixedly mounted on the rear surface of the chassis 40.

As shown in FIG. 3, an upper wall 42, a lower wall 43, and side walls 44 are formed on the respective upper, lower, left, and right edges of the chassis 40 so as to surround the outer circumference of the circuit boards 20. In addition, the upper and lower edges of the reflection sheet 30 have walls 32, 33 respectively formed thereon, which stands inside the upper and lower walls 42, 43 of the chassis 40. Further, the left and right edges of the reflection sheet 30 have side walls 39 respectively arranged thereon, which are elongated in the vertical direction. The side walls 39 are positioned inside the side walls 44 of the chassis 40. A reflection surface is formed on the side wall 39. With the above, all LED's 22 mounted on the circuit boards 20 are surrounded by the walls 32, 33 of the reflection sheet 30 and the reflection surfaces of the side walls 39. As a result, light from the LED's 22 is partially reflected on the walls 32, 33 and the reflection surface of the side walls 39 and then proceeds toward the diffuser panel 62.

As to be described later, the circuit board 20 and the reflection sheet 30 are attached on the chassis 40, using a plurality of support pins 50 mounted on the reflection sheet 30. The above described back frame 71 is fixedly mounted on the walls 42, 43, 44, while sandwiching, between itself and the walls 42, 43, 44 of the chassis 40, the outer circumferential edges of the diffuser panel 62 and the optical sheet 61, the upper edges of the walls 32, 33, and the edges of the side walls 39. With this structure, the diffuser panel 62, the circuit board 20, and the like forms a device unit to thereby constitute the backlight unit 10.

As described above, the backlight unit 10 has a plurality of support pins 50. As shown in FIG. 8, the support pin 50 is provided between the circuit board 20 and the diffuser panel 62, supporting the diffuser panel 62 and the optical sheet 61. Each support pin 50 has a plurality of (two in this example) fixation portions 51, 52 formed on a lower portion thereof. The fixation portions 51, 52 are inserted into, and thereby fixed on, the circuit board 20 and the chassis 40. Further, each support pin 50 has an upright pillar 53 formed on an upper portion thereof. The pillar 53 supports, on the tip end thereof, the diffuser panel 62 and the optical sheet 61. The support pin 50 is made of, e.g., resin.

As shown in FIG. 5 or 7, the support pin 50 has, as the above described fixation portion, a first fixation portion 51 and a second fixation portion 52 positioned apart from the first fixation portion 51. The first fixation portion 51 and the second fixation portion 52 are positioned apart from each other in a direction in parallel to the circuit board 20 (the horizontal direction in this example). In detail, the support pin 50 includes a coupling plate 54 arranged on the reflection sheet 30. The coupling plate 54 is formed as a plate elongated in lateral direction. The first fixation portion 51 and the second fixation portion 52 are connected to the respective both ends of the coupling plate 54.

As shown in FIG. 8, the reflection sheet 30, the circuit board 20, and the chassis 40 have a plurality of holes 31, 21, 41 formed thereon, which respectively passes through the reflection sheet 30, the circuit board 20, and the chassis 40. The holes 31, 21, 41 are respectively formed at positions mutually corresponding to each other and aligned to one another in the up-down direction (that is, a direction perpendicular to the circuit board 20). The first fixation portion 51 projects downward from the connected plate portion 54a formed on one end of the coupling plate 54, being inserted in the holes 31, 21, 41. Meanwhile, the second fixation portion 52 projects downward from the connected plate portion 54b formed on the other end of the coupling plate 54, being inserted in holes 31, 21, 41 different from those for the first fixation portion 51. The first fixation portion 51 and the second fixation portion 52 are fixed to the circuit board 20 and the chassis 40, and the connected plate portions 54a, 54b press the reflection sheet 30 onto the circuit board 20.

In this example, as shown in FIG. 7 or 8, the fixation portion 51, 52 has a down protrusion 51a, 52a connected on the lower surface of the connected plate portion 54a, 54b. The down protrusion 51a, 52a extends from the center of the connected plate portion 54a, 54b and passes through the holes 31, 21, 41 to reach the back side of the chassis 40. The fixation portion 51, 52 additionally includes a fit portion 51b, 52b formed extending diagonally upward from the lower end of the down protrusion 51a, 52 so as to abut on the edge of the hole 41 of the chassis 40. In this example, two fit portions 51b are formed on the first fixation portion 51, being symmetrical to each other with the down protrusion 51a in-between. Two fit portions 52b are formed on the second fixation portion 52, being symmetrical to each other with the down protrusion 52a in-between. The upper portion of the fit portion 51b, 52b is formed bent inward (i.e., toward the down protrusion 51a, 52a), and the fit portion 51b, 52b is elastically deformable inward. With the fixation portions 51, 52 inserted in the holes 21, 31, 41, the upper portions of the fit portions 51b, 52b are held inside the holes 21, 31, 41, being pressed onto the inner surfaces of the holes 21, 41, whereby the first fixation portion 51 and the second fixation portion 52 are fixed to the circuit board 20 and the chassis 40. Note that, the shape of the fixation portion 51, 52 is not limited to the above mentioned shape, and the fixation portion 51, 52 having, e.g., only one fit portion 51b, 52b may be usable.

As described above, the plurality of LED's 22 are arranged in a matrix such that each unit of the matrix is constituted with four LED's 22 disposed on the respective four corners of the quadrangle. As shown in FIG. 6, the first fixation portion 51 is positioned surrounded by four LED's 22 constituting one unit of the matrix. In detail, the first fixation portion 51 is positioned at a cross point of the diagonals L1 of the quadrangle defined by four LED's 22. That is, the down protrusion 51a of the fixation portion 51 is positioned on the straight line L2 (see FIG. 8) perpendicular to the circuit board 20 and passing through the cross point of the diagonals L1. Therefore, the distances between the first fixation portion 51 and the respective four LED's 22 surrounding the first fixation portion 51 are equal to one another, and a sufficient distance can be ensured between the first fixation portion 51 (in other words, the hole 21) and the respective LED 22. This can ensure a high degree of freedom in wiring around the LED 22.

Meanwhile, the second fixation portion 52 is positioned outside the four LED's 22 surrounding the first fixation portion 51, as shown in FIG. 6. In detail, the second fixation portion 52 is positioned opposite the first fixation portion 51 across the straight line L3 passing through two of the four LED's 22 surrounding the first fixation portion 51. That is, the second fixation portion 52 is positioned symmetrical to the first fixation portion 51 relative to the straight line L3. That is, the second fixation portion 52 is surrounded by four LED's 22 that define one unit adjacent to the unit inside which the first fixation portion 51 is positioned. In further detail, similar to the first fixation portion 51, the second fixation portion 52 is positioned at the cross point of the diagonals of a quadrangle defined by four LED's 22. This can ensure a sufficient distance between the second fixation portion 52 and the respective LED's 22.

As described above, the first fixation portion 51 and the second fixation portion 52 project downward from the respective connected plate portions 54a, 54b formed on the respective both ends of the coupling plate 54. Because the connected plate portion 54a, 54b has a substantially round outer circumference, as shown in FIG. 5 or 6, no part of the outer circumference of the connected plate portion 54a, 54b is positioned particularly closer to any of the four LED's 22 surrounding the fixation portion 51, 52. Therefore, the connected plate portion 54a, 54b can hardly hinder light reflection by the reflection sheet 30. Note that, in this example, the down protrusion 51a, 52a of the fixation portion 51, 52 is positioned directly below the center of the connected plate portion 54a, 54b.

As shown in FIG. 6, the coupling plate 54 has a narrower width in the middle part thereof. That is, the coupling plate 54 has a elongated panel-like extending portion 54c that extends between the connected plate portion 54a and the connected plate portion 54b and perpendicularly intersects the straight line L3 mentioned above. The width W1 of the extending portion 54c (the width in a direction orthogonal to the straight line connecting the first fixation portion 51 and the second fixation portion 52) is smaller than the width W2 of the connected plate portion 54a, 54b (in other words, the diameter of the connected plate portion 54a, 54b). With this formation, an increased distance can be obtained between the two LED's 22 located between the first fixation portion 51 and the second fixation portion 52 (the LED 22 positioned on the straight line L3) and the extending portion 54c. This can prevent the coupling plate 54 from hindering reflection of the light from the LED's 22. Further, the larger diameter of the connected plate portion 54a, 54b can effectively prevent the reflection sheet 30 from floating above from the circuit board 20.

Further, the support pin 50 has the pillar 53 for supporting the diffuser panel 62 and the optical sheet 61, as described above. As shown in FIG. 7 or 8, the pillar 53 is formed having a substantial corn shape that becomes thinner as it goes toward the tip end thereof, that is, toward the diffuser panel 62. The tip end of the pillar 53 abuts on the lower surface of the diffuser panel 62. The distance from the circuit board 20 and the reflection sheet 30 to the diffuser panel 62 is defined by the pillar 53.

The pillar 53 is aligned with the first fixation portion 51 in a direction perpendicular to the circuit board 20 or the like. That is, the pillar 53 stands directly above the first fixation portion 51. Therefore, as shown in FIG. 6, in a plan view of the circuit board 20 and the reflection sheet 30, the pillar 53 is surrounded by a plurality of (four in this example) LED's 22 constituting one unit of the matrix, similar to the first fixation portion 51. In this example, the pillar 53 is formed having a corn shape projecting directly upright (toward the diffuser panel 62) from the center of the connected plate portion 54a of the coupling plate 54. The straight line L2 passing through the cross point of the diagonals L1 defines the central line of the pillar 53 (see FIG. 8). Note that the support pin 50 has one coupling plate 54 such that the pillar 53 and the coupling plate 54 together present a substantially L-shape as a whole.

As shown in FIG. 3, a plurality of support pins 50 are provided dispersedly in the vertical and horizontal directions, to thereby stably support the diffuser panel 62 and the optical sheet 61. That is, the plurality of support pins 50 are provided with a constant interval in the entire circuit boards 20 such that a constant distance can be ensured between the diffuser panel 62 and the circuit board 20 in the entire backlight unit 10.

As described above, the backlight unit 10 comprises a circuit board 20 having, on the front side thereof, a plurality of LED's 22 arranged in a matrix, an optical member (the diffuser panel 62 and the optical sheet 61 in the above description) arranged on the front side of the circuit boards 20 and facing the circuit board 20. The light from the plurality of LED's 22 passes through the optical member. Further, the backlight unit 10 includes support pins 50 arranged between the circuit board 20 and the diffuser panel 62 for supporting the optical member. The support pin 50 includes the first fixation portion 51, the second fixation portion 52, and the pillar 53. The first fixation portion 51 is inserted into a hole formed on the circuit board 20, and the second fixation portion 52, positioned apart from the first fixation portion 51 in a direction in parallel to the surface of the circuit board 20, is inserted in another hole 21. The pillar 53 is formed aligned to the first fixation portion 51 in a direction perpendicular to the circuit board 20, supporting the optical member.

With the above described backlight unit 10, the first fixation portion 51 positioned far from the respective LED's 22 results in the pillar 53 as well positioned far from the LED's 22. This can realize increased freedom in wiring around the LED's 22 and also prevent the pillar 53 from hindering the light from the LED's 22. Further, provision of the second fixation portion 52 to the support pin 50 in addition to the first fixation portion 51 ensures preferable stability in attachment.

Further, workability in attaching the support pin 50 to the circuit board 20 or the like can be improved. That is, in attaching the support pin 50 to the circuit board 20 or the like, a person working inserts the first fixation portion 51 into the holes 31, 21, 41 while picking the pillar 53 of the support pin 50. Because the pillar 53 is positioned directly above the first fixation portion 51, a force by a person working can be applied more directly to the first fixation portion 51, compared to a conventional support pin with the pillar 53 positioned at the middle between the first fixation portion 51 and the second fixation portion 52. The formation of the support pin 50 as described above makes it easier to insert the first fixation portion 51 into the holes 31, 21, 41.

Note that the present invention is not limited to the above described backlight unit 10, and can be modified in various manners.

For example, each support pin 50 has two fixation portions 51, 52 formed thereon in the above description. However, the number of fixation portions 51, 52 is not limited to this number, and a larger number of fixation portions 51, 52 may be formed on each support pin 50 and coupled by coupling plates.

Further, one pillar 53 is provided to the support pin 50 in the above description. However, the number of pillars 53 is not limited to the above, and the pillar 53 may be formed directly above the second fixation portion 52 in addition to the first fixation portion 51.

Further, in the above description, the pillar 53 projects upward from the center of the connected plate portion 54a so that the central line of the pillar 53 coincides with the straight line L2 passing through the cross point of the diagonals L1, and further, the down protrusion 51a of the first fixation portion 51 projects downward from the center of the connected plate portion 54a to be positioned on the straight line L2. However, the central line of the pillar 53 or the down protrusion 51a of the first fixation portion 51 may be positioned slightly displaced from the straight line L2. For example, the pillar 53 and the down protrusion 51a may project upward and downward, respectively, from a position near an edge of the connected plate portion 54*a*.

Further, the backlight unit 10 has, as an optical member, the diffuser panel 62 and the optical sheet 61. However, the present invention may be applied to a backlight unit having only either one of the diffuser panel 62 and the optical sheet 61.

Further, in the above description, the plurality of LED's 22 mounted on the circuit board 20 defines a quadrilateral unit of the matrix. However, the shape of the unit is not limited to quadrilateral, and may be, e.g., triangular or pentangular, instead.

What is claimed is:

1. A backlight unit for a liquid crystal display, comprising:
   a substrate having, on a front side thereof, a plurality of light sources arranged in a matrix;
   an optical member arranged to face the front side of the substrate, light from the plurality of light sources being transmitted through the optical member; and
   a support pin positioned between the substrate and the optical member, for supporting the optical member, wherein
   the support pin includes
      a first fixation portion inserted in a hole formed on the substrate,
      a second fixation portion inserted in a hole formed on the substrate and positioned apart from the first fixation portion; and
      a pillar aligned to the first fixation portion in a direction perpendicular to the substrate and having a tip end supporting the optical member,
   wherein the first fixation portion is surrounded by a plurality of light sources constituting one unit in the matrix in which the plurality of light sources are arranged, and
   the second fixation portion is positioned outside the plurality of light sources surrounding the first fixation portion.

2. The backlight unit according to claim 1, wherein
   the plurality of light sources surrounding the first fixation portion are positioned in respective four corners of a quadrangle, and
   the first fixation portion is positioned at a cross point of diagonals of the quadrangle.

3. The backlight unit according to claim 1, wherein the second fixation portion is positioned opposite the first fixation portion across a straight line, the straight line passing through two of the plurality of light sources surrounding the first fixation portion.

4. The backlight unit according to claim 3, wherein
   the support pin includes a coupling portion positioned on the front side of the substrate, for coupling the first fixation portion and the second fixation portion,
   the coupling portion includes a first connected portion to which the first fixation portion is connected, a second connected portion to which the second fixation portion is connected, and an extending portion extending between the first connected portion and the second connected portion, and
   the width of the extending portion is smaller than the width of the first connected portion and the width of the second connected portion.

5. A liquid crystal display having the backlight unit according to claim 1.

* * * * *